Dec. 4, 1945.  C. J. DAVIES  2,390,208
HEATING APPARATUS
Original Filed March 11, 1940  4 Sheets-Sheet 1
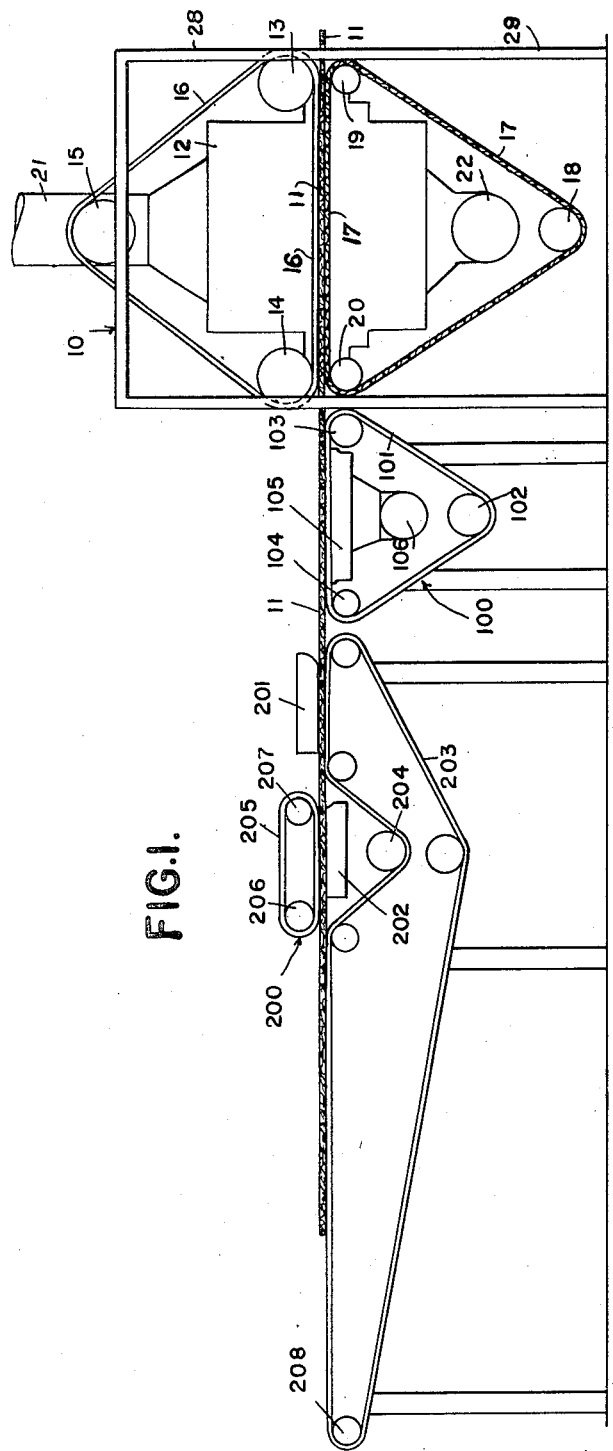
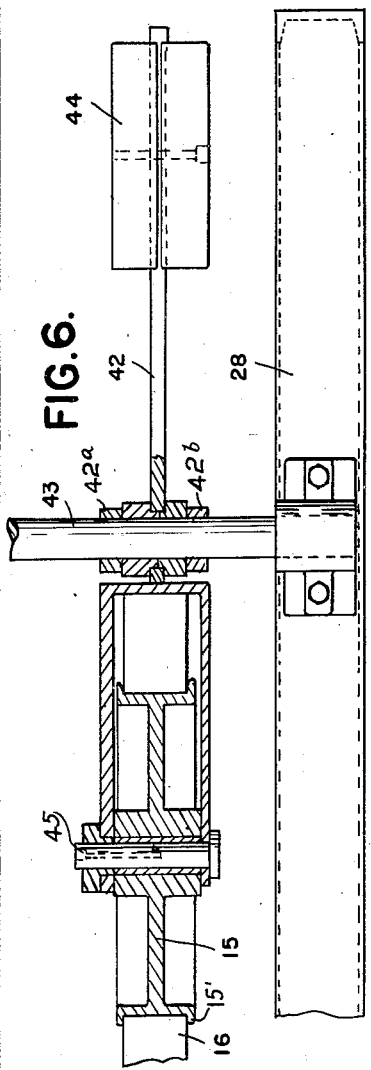
INVENTOR.
CLARENCE J. DAVIES
BY
ATTORNEYS

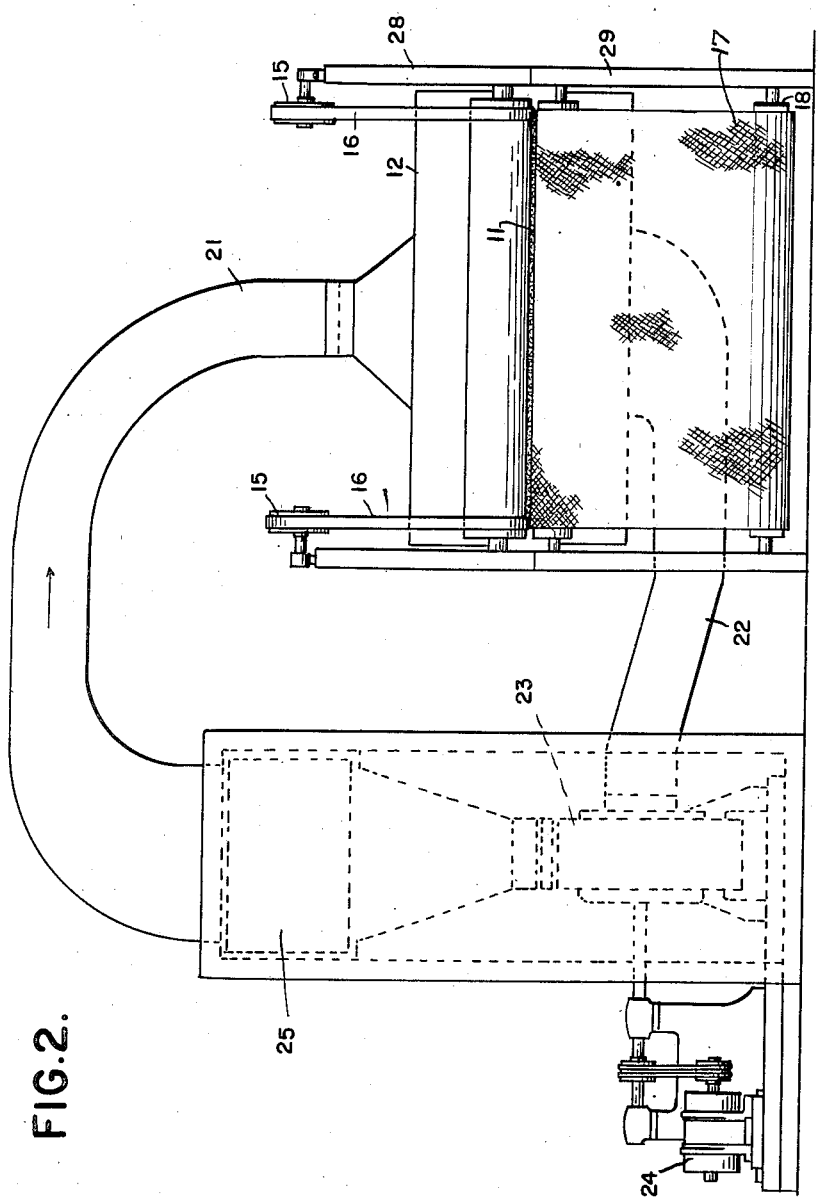

Dec. 4, 1945.    C. J. DAVIES    2,390,208
HEATING APPARATUS
Original Filed March 11, 1940    4 Sheets-Sheet 3
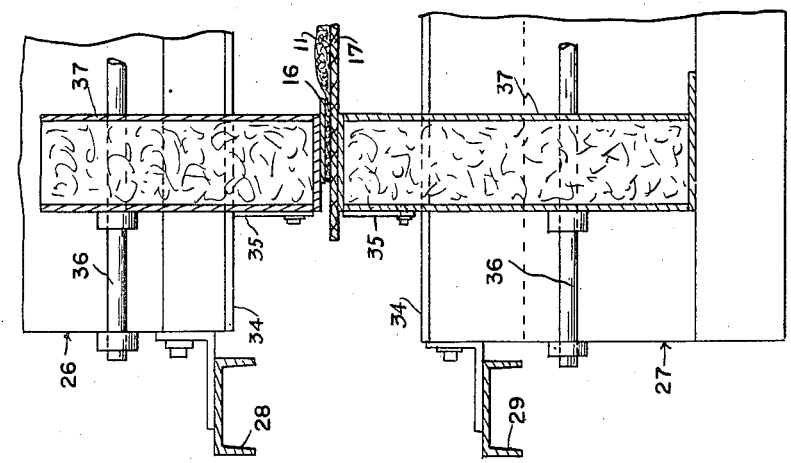
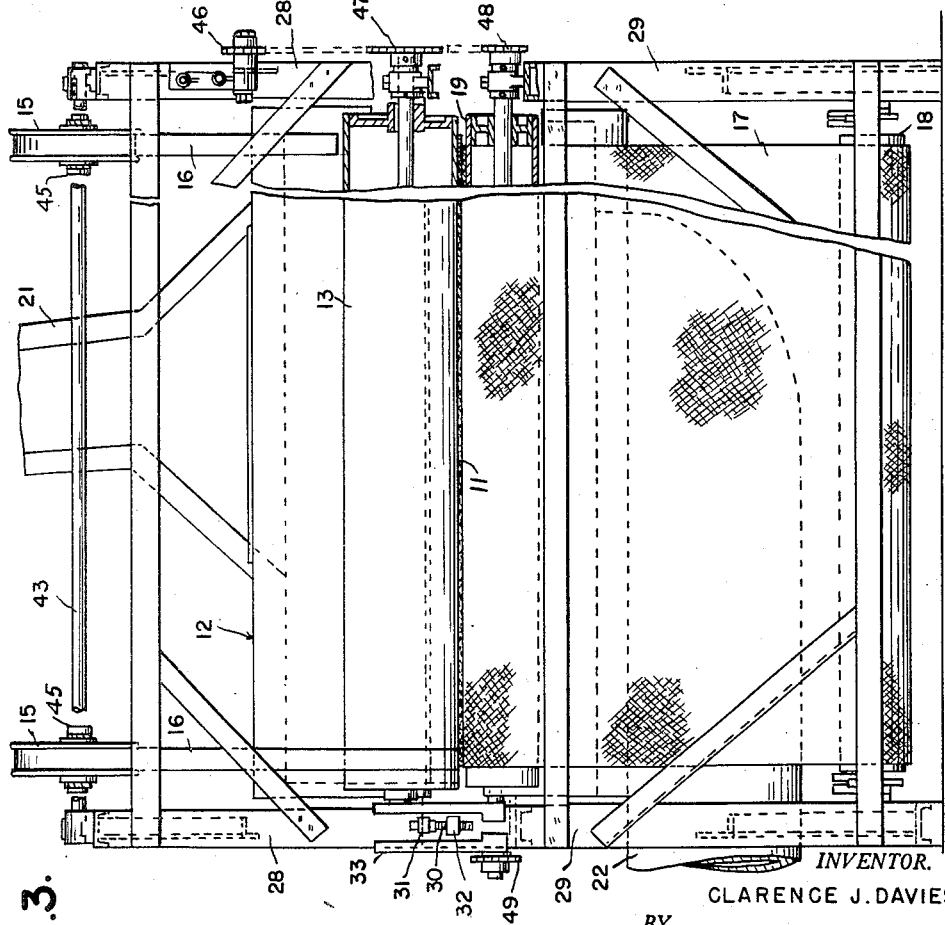
INVENTOR.
CLARENCE J. DAVIES
BY
Whittemore Hulbert & Belknap
ATTORNEYS Dec. 4, 1945.  C. J. DAVIES  2,390,208
HEATING APPARATUS
Original Filed March 11, 1940   4 Sheets-Sheet 4

INVENTOR.
CLARENCE J. DAVIES
BY
ATTORNEYS

Patented Dec. 4, 1945

2,390,208

UNITED STATES PATENT OFFICE 2,390,208

HEATING APPARATUS

Clarence J. Davies, Detroit, Mich., assignor to National Automotive Fibres, Inc., Detroit, Mich., a corporation of Delaware Original application March 11, 1940, Serial No. 323,430, now Patent No. 2,383,849, dated August 28, 1945. Divided and this application July 26, 1943, Serial No. 496,207

15 Claims. (Cl. 154—27)

This invention relates generally to apparatus employed in the manufacture of sheet material such as fibrous insulating material, and constitutes a division of my application filed March 11, 1940, bearing Serial No. 323,430 and matured into Patent No. 2,383,849 of August 28, 1945.

According to the present invention a fibrous insulating material of sheet-like construction, having high insulating qualities and being comparatively soft and resilient while at the same time having surface characteristics such that it can withstand rough handling, is produced. Briefly described and according to the method at present preferred, the insulating material is produced by interspersing a dry, powdered thermoplastic binder substantially uniformly through a relatively thick web of loosely aggregated fibrous material, such for example as cotton. The web of fibrous material is heated by positively forcing heated air therethrough in a manner to soften the thermoplastic particles. Each thermoplastic particle serves to bind together the adjacent fibers with the result that the entire web has a multiplicity of zones wherein the fibrous materials are bonded together.

After softening of the thermoplastic material the web is compressed to the desired thickness, preferably leaving the same comparatively soft and resilient. Since the thermoplastic binder material is soft at this time, the web tends to remain at the thickness to which it was compressed. Further operations are performed to improve the surface of the web in a manner to increase its smoothness and its strength. These subsequent operations may take numerous forms, and in its simplest form comprises the step of smoothing the surface of the web while the thermoplastic binder is still in a soft or plastic condition. According to the preferred embodiment, the web after compression is cooled by circulation of cooling air therethrough and thereabout in a manner to cause the thermoplastic material to set. Subsequently the material is treated by providing sliding contact between one surface of the web and a smooth heated surface. This operation is referred to herein as "ironing" and serves the purpose of first softening the thermoplastic material adjacent the surface without softening the thermoplastic material within the body of the web. The sliding contact between the surface of the web and the surface of the ironing element smooths the surface and compacts the fibrous material at the surface without compacting the fibers in the interior of the web where the thermoplastic binder has already set.

With the foregoing general remarks in view, it is accordingly an object of the present invention to produce a new article of manufacture in the form of a fibrous sheet material having smooth, compacted surfaces.

It is a further object of the present invention to provide a sheet material composed of partly compressed fibrous material retained in compressed state by means of a binder and having surfaces substantially smooth and compacted and having an increased amount of binder therein.

More specifically it is a further object of the present invention to produce fibrous material of the character described by an apparatus which includes means for heating and smoothing the surface of fibrous sheet material having a thermoplastic binder therein.

It is a further object of the present invention to provide, in apparatus of the character described, a chamber for positively forcing heated air through an advancing fibrous web.

It is a further object of the present invention to provide an apparatus for producing the product described, which comprises means for continuously advancing a fibrous web containing a thermoplastic binder, means for compressing the web to a desired degree, means for causing the binder to set, and means effective thereafter for softening the binder through a shallow zone adjacent a surface of the web, in conjunction with means for smoothing the surface of the web.

Other objects of the invention will be apparent as the description proceeds, and when taken in conjunction with the accompanying drawings, wherein:

Figure 1 is a more or less diagrammatic view illustrating the complete apparatus for treating the binder impregnated web;

Figure 2 is a diagrammatic view illustrating means for circulating heated air through a heating chamber;

Figure 3 is an end view partly in section of the heating chamber;

Figure 5 is a section on the line 5—5 of Figure 4;

Figure 6 is a section on the line 6—6 of Figure 4;

Figure 7:
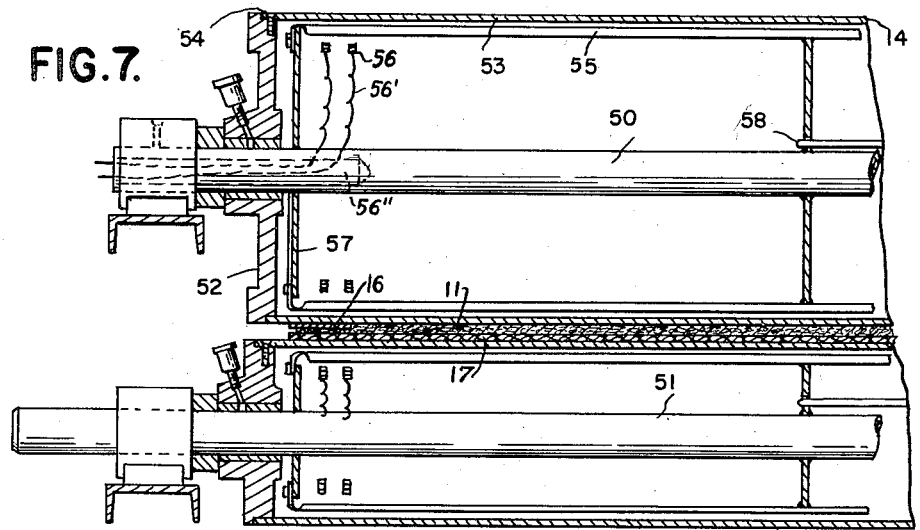
Figure 7 is a section on the line 7—7 of Figure 4.

Referring now to the drawings and more particularly to Figure 1 thereof, 10 is a heating device for heating and softening the thermoplastic material dispersed in powdered form through the web 11 of fibrous material, and 12 is a sealing chamber which constitutes a part of said heating device.

Rolls 13, 14 and 15, respectively, are provided for carrying bands or belts 16 adapted to contact the edges of the fibrous web 11. A foraminous conveyor belt 17 is carried by rolls 18, 19 and 20, respectively, for supporting the fibrous web and for permitting the forced circulation of heated air therethrough. Air from a blower 23 is forced through a conduit 21 to the sealing chamber 12 and returns through a conduit 22 to the blower 23. The fibrous web enters the chamber 12 between the rolls 13 and 19 and leaves the chamber between the rolls 14 and 20. Preferably the rolls 14 and 20 are close enough to each other to compress the web a desired degree.

After having been compressed to a desired degree, the web passes next to a cooling device indicated generally at 100 which has a supporting conveyor belt 101 carried by rolls 102, 103 and 104. The belt 101 advances the fibrous material 11 over a box 105 connected to a suction conduit 106 adapted to draw air downwardly through and around the web 11 to cool the same and to cause the thermoplastic binder therein to set.

After cooling, the fibrous web 11 advances past a surfacing apparatus indicated generally at 200, which comprises a first ironer 201 and a second ironer 202. As the material advances beneath the first ironer 201 it is supported by suitable means, not shown in this figure, engaging a conveyor belt 203 which causes the fibrous material to be held in light but firm friction contact with the lower smooth surface of the ironer 201.

The conveyor belt 203 drops away from the plane of advance of the fibrous web 11 around a roll 204 to provide space for the second ironer 202. A second short conveyor belt 205 is mounted between rolls 206 and 207 which causes the fibrous material to be positively advanced in light but firm pressure contact against the upper surface of the heated iron 202. The complete material is advanced on the conveyor 203 toward the end roll 208 at which time it is in completely finished condition.

Referring now more particularly to Figure 2, I have illustrated the arrangement of parts which provides for the circulation of heated air through the heating chamber 12. As shown, the blower 23 is driven by a motor 24 and circulates air in the direction indicated by the arrows through the conduit 21 and the return conduit 22. Suitable means are provided between blower 23 and the conduit 21 for heating the air, and these means preferably take the form of an electric heating device indicated at 25. Obviously, instead of the electric heating device 25, a steam heater or the like could be substituted.

Figure 4:
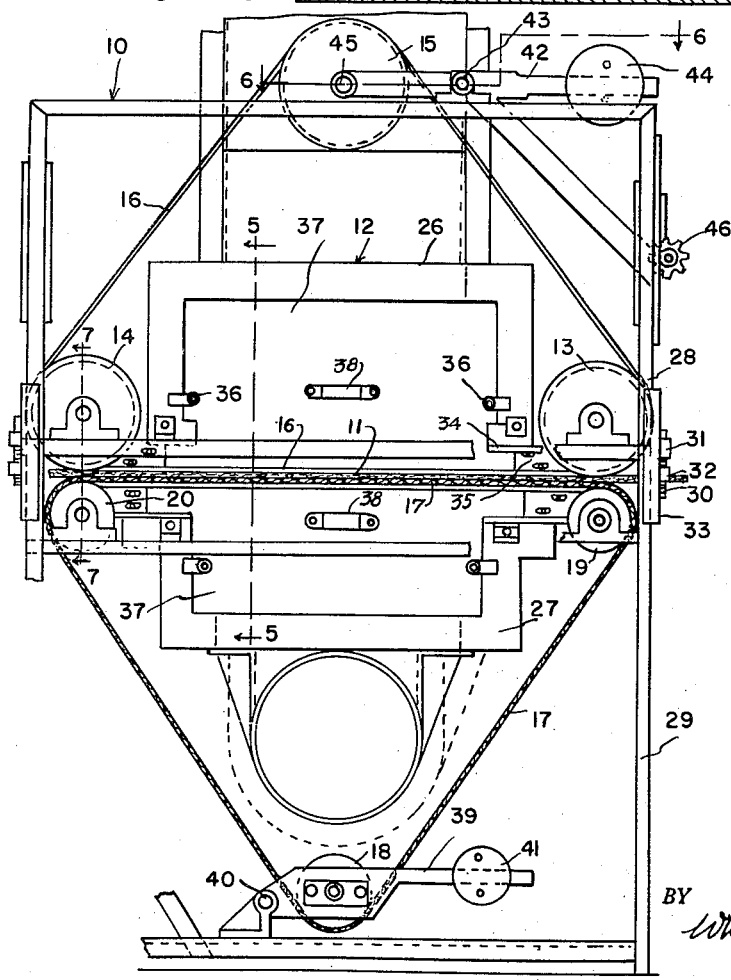
Figure 4 is an enlarged side elevation of the heating chamber.

Referring now more particularly to Figures 3, 4, 5, 6 and 7, the heating chamber is made in two halves 26 and 27, carried by corresponding frame portions 28 and 29. As best seen in Figure 4, frame portions 28 and 29 are secured together by means of bolts 30 passing through cooperating lugs 31 and 32 carried by the separate frame portions. Preferably the frame elements are angle irons, and guiding elements 33 overlap the angle irons.

The lower frame portion 29 carries the rolls 19 and 20, and the upper frame portion 28 carries the rolls 13 and 14. As will be evident, vertical adjustment of the upper frame 28 relative to the lower frame 29 results in a corresponding adjustment between the spacing of rolls 13 and 19 on the one hand and 14 and 20 on the other hand.

The heating chamber 12 is preferably of double wall sheet metal construction having insulating material of any suitable type therebetween.

Means are provided for insuring that all of the air passing through the conduits 21 and 22 must pass through and not around the fibrous web 11. In Figures 4 and 5 I have shown adjustable plates 34 which may be moved into exact registry with the various rolls. Preferably the sealing means cooperating with each of the rolls 13, 14, 19 and 20 are identical, hence reference numerals are applied only to those cooperating with the roll 13. End plates 35, having one surface curved in conformity to the curvature of the rolls, are also provided, and are adjustable toward and away from the rolls. As will be evident, by adjustment of the plates 34 and 35, escape of air from the chamber 12 is thus effectively prevented.

In Figures 4 and 5 I have shown transversely extending rods 36 which extend across the heating chamber 12 and on which side closures 37 are slidably mounted. Handles 38 are provided on the slidable side closures 37 for convenient adjustment thereof. It is desirable to adjust the side closures 37 to correspond to different widths of fibrous web being treated. The side closures 37 cooperate with the bands 16 previously referred to to prevent escape of air around the side edges of the fibrous web 11 as it advances. By this means all of the air is positively forced through the fibrous web with the result that the thermoplastic binder therein will be uniformly softened throughout, and this can be accomplished with the fibrous material advancing at a substantial rate through the heating chamber. As will be evident, if reliance were placed upon penetration of the heated air into the fibrous web without positively forcing the air therethrough, a substantially greater interval of time would be necessary to soften the thermoplastic binder in the interior of the web.

The foraminous conveyor 17 passes around the rolls 18, 19 and 20 and is retained by the lowermost roll 18 at a desired degree of tension. For this purpose the roll 18 is mounted for free rotation on a lever 39, pivoted as indicated at 40 and having a weight 41 secured thereto. In like manner the bands 16 pass around the rolls 13, 14 and 15. Preferably the bands are slidable lengthwise of the rolls 13 and 14 and are retained under a desired degree of tension by means of the upper roll 15. The rolls 15 are carried by levers 42 slidable on a shaft 43 and having weights 44 carried thereby. Preferably, the rolls 15 are provided with side flanges 15′ for guiding the bands 16.

To accommodate different width of web, the levers 42 carrying the upper rolls 15 mounted on shafts 45, may be adjusted lengthwise of the shaft 43 and may be held in such adjusted position by suitable retainers 42a and 42b respectively. As previously stated the bands 16 are slidable lengthwise of the rolls 13 and 14 and cooperate with the adjustable closures 37 to seal the interior of the heating chamber 12. Inasmuch as both the closures 37 and bands 16 are adjustable transversely of the chamber 12 it will be apparent that they will accommodate different widths of web.

In the manufacture of the product, it is preferred to associate the mechanism herein disclosed with a Garnett of conventional type, provided with means for depositing powdered or comminuted thermoplastic binder. The Garnett, as is well known, is provided with a conveyor, and conveniently the drive for the apparatus herein illustrated may be taken from the Garnett. For example, a chain from the Garnett drive may lead over the chain tightening sprocket 46 and around the sprockets 47 and 48, which are secured in driving relation to the rolls 13 and 14 respectively. Sprockets 47 and 48 are of such diameter that the surface speeds of the rolls 13 and 14 are the same. In Figure 3 I have illustrated a second sprocket 49 carried at the opposite end of the drive shaft for the roll 14, and this sprocket may be connected by a separate chain for driving conveyors 101, 203 and 205 in timed relation.

As previously stated, the spacing of the rolls 13 and 14 on the one hand and 19 and 20 on the other hand are accomplished by means of bolts 30. When the fibrous web passes between the rolls 13 and 19 it is substantially compressed, and these rolls therefore serve the function of sealing rolls to prevent the escape of heated air therebetween as the fibrous material is fed into the chamber 12. Immediately after the fibrous material has passed the rolls 13 and 19 it regains substantially its initial thickness due to the fact that at this time the binder has not been softened by heat. When the material passes between the rolls 14 and 20, however, the binder material is softened so that the fibrous web tends to retain substantially the thickness to which it is compressed between rolls 14 and 20. These rolls may therefore be considered as gauge rolls for determining the thickness of the finished sheet material. Preferably the gauge rolls 14 and 20 are heated so that the softened thermoplastic material will not adhere thereto.

In Figure 7 I have illustrated the rolls 14 and 20 as mounted on stationary shafts 50 and 51 respectively. Referring first to the roll 14, circular end plates 52 are provided and the surface of the roll is formed by a cylindrical shell 53 removably secured in suitable recesses in the plates 52 and secured therein as indicated at 54. Heating elements 55 are indicated in Figure 7, and these may be electrical, steam, or other types, but for convenience it is preferred to employ electrical heating elements. The electric heating elements are carried by supporting plates 57 and have electric terminals 56 provided with electric conductors 56' that extend into an axially extending bore 56" of the stationary shaft 50. At 58 I have indicated the thermosensitive element of a thermostatic control. Construction of the lower roll 20 and its heating element is substantially identical, and will not be separately described.

What I claim as my invention is:

1. In apparatus of the character described, a heating chamber, an air-pervious conveyor belt for advancing a continuous fibrous web through said chamber, narrow bands movable with said conveyor belt and arranged to overlie the edges of said web, at least one of said bands being adjustable transversely of said conveyor belt to accommodate various widths of webs, means for forcing a current of heated air through said chamber and conveyor belt, said chamber having a side wall which is adjustable transversely of said conveyor belt to accommodate various widths of webs, whereby the side walls of said chamber and said narrow bands may be set closely adjacent the edges of a web so as to cause substantially all of the heated air to be forced through said web.

2. In apparatus of the character described, a heating chamber, a conveyor belt for advancing a continuous fibrous web through said chamber, narrow bands movable with said conveyor belt and arranged to overlie the edges of said web, at least one of said bands being adjustable transversely of said conveyor belt to accommodate various widths of webs, and means for forcing a current of heated air through said chamber, said chamber having a side wall adjustable transversely of said conveyor belt to accommodate various widths of webs.

3. In apparatus of the character described, a lower housing portion open at its top, rolls disposed at opposite ends of the open top, a conveyor belt movable over said rolls and completely spanning said open top, an upper housing portion open at its bottom in registry with said belt, rolls disposed at opposite ends of the open bottom in vertical alignment and adapted to cooperate with the rolls aforesaid to compress a continuous fibrous web advanced on said belt, bands running beneath the rolls carried by the upper housing portion and adapted to extend over the edges of the fibrous web, said bands being relatively adjustable transversely of said belt to accommodate different widths of web, the side walls of said upper housing portion being relatively adjustable transversely of said belt and arranged to partly overlie said bands, and means for forcing heated air through said housing portions.

4. In apparatus of the character described, a lower housing portion open at its top, rolls disposed at opposite ends of the open top, a conveyor belt movable over said rolls and completely spanning said open top, an upper housing portion open at its bottom in registry with said belt, rolls disposed at opposite ends of the open bottom in vertical alignment and adapted to cooperate with the rolls aforesaid to compress a continuous fibrous web advanced on said belt, bands running beneath the rolls carried by the upper housing portion and adapted to overlie the edges of the fibrous web, said bands being relatively adjustable transversely of said belt to accommodate different widths of web, and means for forcing heated air through said housing portions, at least two of the vertically aligned rolls aforesaid being heated to soften the web as it is compressed.

5. In apparatus of the character described, a heating chamber having a lower housing portion provided with an open top and having an upper housing portion provided with an open bottom, the open top and the open bottom being in opposed registration, rolls at opposite ends of the open top, a conveyor belt movable over said rolls, and rolls at opposite ends of the open bottom substantially in vertically spaced alignment with and adapted to cooperate with the rolls aforesaid to compress a fibrous web advanced on said belt, said upper and lower housing portions being relatively adjustable to vary the vertical spacing of the first mentioned rolls relative to the second mentioned rolls and vary the amount of compression thereby of the fibrous web.

6. In apparatus of the character described, a heating chamber having a lower housing portion provided with an open top and having an upper housing portion provided with an open bottom, the open top and the open bottom being in opposed registration, rolls at opposite ends of the open top, a conveyor belt movable over said rolls, rolls at opposite ends of the open bottom subtantially in vertically spaced alignment with and adapted to cooperate with the rolls aforesaid to compress a fibrous web advanced on said belt, and means for adjusting one of said housing portions relative to the other to vary the vertical spacing of the first mentioned rolls relative to the second mentioned rolls and vary the amount of compression thereby of the fibrous web.

7. In apparatus of the character described, a chamber containing heated air and having box-like sections spaced apart and opening toward each other, said sections being provided with separate supporting frame portions, a foraminous conveyor belt extending between said spaced sections for advancing sheet material through said chamber to be heated by the air therein, cooperating rolls upon opposite sides of said belt adjacent the front and rear of said chamber for compressing the advancing sheet material, said cooperating rolls being carried respectively by said frame portions, and connections between said frame portions including means for adjusting said frame portions relative to each other to vary the compressive action of said cooperating rolls upon said advancing sheet material.

8. In apparatus of the character described, a chamber containing heated air and having box-like sections spaced apart and opening toward each other, said sections being provided with separate supporting frame portions, a foraminous conveyor belt extending between said spaced sections for advancing sheet material through said chamber to be heated by the air therein, cooperating rolls upon opposite sides of said belt adjacent the front and rear of said chamber for compressing the advancing sheet material, said cooperating rolls being carried respectively by said frame portions, connections between said frame portions including means for adjusting said frame portions relative to each other to vary the compressive action of said cooperating rolls upon said advancing sheet material, and means cooperating with portions of said sections to prevent escape of heated air laterally outward from said chamber over the side edges of said advancing sheet material, including bands extending between said sections in overlapping relation to the side edges of said advancing sheet material.

9. In apparatus of the character described, a sectional heating chamber containing heated air, two sets of vertically spaced rolls disposed respectively in front and in rear of said chamber, a conveyor belt for sheet material extending between the rolls of each set and between the sections of said chamber, the rolls of each set cooperating with each other to compress the sheet material, said rolls being adjustable to vary the amount of compression, and movable bands overlapping the side edges of said sheet material and cooperating with portions of the chamber to prevent escape of air from said chamber over the side edges of the sheet material, said bands and portions of said heating chamber being relatively adjustable transversely of said belt to accommodate different widths of sheet material.

10. In apparatus of the character described, a sectional heating chamber containing heated air, two sets of vertically spaced rolls disposed respectively in front and in rear of said chamber, a conveyor belt for sheet material extending between the rolls of each set and between the sections of said chamber, the rolls of each set cooperating with each other to compress the sheet material, said rolls being adjustable to vary the amount of compression, and movable bands overlapping the side edges of said sheet material and cooperating with portions of the chamber to prevent escape of air from said chamber over the side edges of the sheet material.

11. In apparatus of the character described, a sectional heating chamber containing heated air, two sets of vertically spaced rolls disposed respectively in front and in rear of said chamber, a conveyor belt for sheet material extending between the rolls of each set and between the sections of said chamber, the rolls of each set cooperating with each other to compress the sheet material, and movable bands overlapping the side edges of said sheet material and cooperating with portions of the chamber to prevent escape of air from said chamber over the side edges of the sheet material, said bands being adjustable transversely of said belt to accommodate different widths of sheet material.

12. In apparatus of the character described, a sectional heating chamber containing heated air, two sets of vertically spaced rolls disposed respectively in front and in rear of said chamber, a conveyor belt for sheet material extending between the rolls of each set and between the sections of said chamber, the rolls of each set cooperating with each other to compress the sheet material, and movable bands overlapping the side edges of said sheet material and cooperating with portions of the chamber to prevent escape of air from said chamber over the side edges of the sheet material, said bands and portions of said heating chamber being relatively adjustable transversely of said belt to accommodate different widths of sheet material.

13. In apparatus of the character described, a sectional heating chamber containing heated air, two sets of vertically spaced rolls disposed respectively in front and in rear of said chamber, a conveyor belt for sheet material extending between the rolls of each set and between the sections of said chamber, the rolls of each set cooperating with each other to compress the sheet material, and movable bands overlapping the side edges of said sheet material and cooperating with portions of the chamber to prevent escape of air around the side edges of the sheet material, at least one set of the rolls aforesaid being heated to soften the sheet material as it is compressed.

14. In apparatus of the character described, a movable air-pervious conveyor belt for sheet material, a sectional chamber having a lower portion below said belt and an upper portion above said belt, means for positively forcing air through said chamber and through said belt, at least one side part of each chamber portion being adjustable transversely of said belt, narrow movable bands overlapping the side edges of said sheet material and movable with said belt relative to the adjustable part of said upper chamber portion, at least one of said bands being adjustable transversely of said sheet material, said bands cooperating with the adjustable side parts of said chamber portions to prevent air forced through the chamber from escaping therefrom over opposite side edges of the sheet material.

15. In apparatus of the character described, a horizontally disposed conveyor belt for sheet material, a chamber made up of a lower portion below said belt, and an upper portion above said belt, means for positively forcing heated air through said chamber, at least one side wall of said portions being adjustable transversely of said sheet material, and bands above said conveyor belt and movable therewith, said bands being beneath the side walls of said upper chamber portion and overlapping the side edges of said sheet material, at least one of said bands being adjustable transversely of said sheet material.

CLARENCE J. DAVIES.